(12) United States Patent
Kassner et al.

(10) Patent No.: US 7,422,769 B2
(45) Date of Patent: Sep. 9, 2008

(54) PROTECTIVE COATING FOR APPLICATION TO A SUBSTRATE AND METHOD FOR MANUFACTURING A PROTECTIVE COATING

(75) Inventors: Stefan Kassner, Dresden (DE); Markus Niedermeier, Munich (DE); Horst Pillhoefer, Roehrmoos (DE)

(73) Assignee: Mtu Aero Engines GmbH, Munich (DE)

( * ) Notice: Subject to any disclaimer, the term of this patent is extended or adjusted under 35 U.S.C. 154(b) by 364 days.

(21) Appl. No.: 11/181,284

(22) Filed: Jul. 14, 2005

(65) Prior Publication Data

US 2006/0292390 A1    Dec. 28, 2006

(30) Foreign Application Priority Data

Jul. 16, 2004    (DE) .................. 10 2004 034 410

(51) Int. Cl.
*B05D 3/04* (2006.01)
*B05D 1/24* (2006.01)
*B05D 1/10* (2006.01)

(52) U.S. Cl. .................. 427/191; 427/229; 427/253; 427/383.1; 427/453; 427/456; 416/241 R

(58) Field of Classification Search .................. None
See application file for complete search history.

(56) References Cited

U.S. PATENT DOCUMENTS

| | | | |
|---|---|---|---|
| 3,873,347 A | 3/1975 | Walker et al. ............ 117/71 M |
| 4,080,486 A | 3/1978 | Walker et al. ............ 428/653 |
| 4,145,481 A * | 3/1979 | Gupta et al. ............ 428/678 |
| 4,585,481 A | 4/1986 | Gupta et al. ............ 106/14.05 |
| 4,897,315 A * | 1/1990 | Gupta ............ 428/552 |
| 4,910,092 A * | 3/1990 | Olson et al. ............ 428/557 |
| 5,236,745 A * | 8/1993 | Gupta et al. ............ 427/454 |
| 5,308,399 A * | 5/1994 | Pillhoefer et al. ............ 118/719 |
| 5,455,071 A | 10/1995 | Pillhoefer et al. |
| 6,156,123 A * | 12/2000 | Pillhoefer et al. ............ 118/715 |
| 6,485,845 B1 | 11/2002 | Wustman et al. |
| 6,497,758 B1 * | 12/2002 | Hasz et al. ............ 106/1.05 |
| 6,555,179 B1 * | 4/2003 | Reeves et al. ............ 427/454 |
| 6,709,711 B1 * | 3/2004 | Wydra et al. ............ 427/405 |

FOREIGN PATENT DOCUMENTS

| | | |
|---|---|---|
| DE | 2 414 992 | 10/1974 |
| DE | 10065924 | 9/2002 |
| EP | 0 486 489 B1 | 11/1994 |
| EP | 0933448 | 1/1999 |
| EP | 0979881 | 7/1999 |
| EP | 1088907 | 9/2000 |
| WO | WO 99/63126 | * 12/1999 |

* cited by examiner

*Primary Examiner*—John J Zimmerman
(74) *Attorney, Agent, or Firm*—Davidson, Davidson & Kappel, LLC

(57) ABSTRACT

A refractory, oxidation-resistant, and corrosion-resistant protective coating for application to a substrate, in particular for application to parts of turbines or aircraft propulsion engines, is described, including a spray coating made of a thermally sprayed, primarily metallic material, the coating being at least partially subjected to a thermochemical aluminum (Cr, Si) deposition process having a specifically high aluminum deposition activity after the application of the protective coating to the substrate, in such a way that the protective coating has alloy gradients of Al (Cr, Si) which increase from the substrate surface to the coating surface and isolated globulitic metal oxide particles. Furthermore, a method for manufacturing this protective coating and its use are described.

4 Claims, 2 Drawing Sheets

PROTECTIVE COATING FOR APPLICATION TO A SUBSTRATE AND METHOD FOR MANUFACTURING A PROTECTIVE COATING

Priority is claimed to German Patent Application Serial No. DE 10 2004 034 410.8, filed Jul. 16, 2004, the entire disclosure of which is hereby incorporated by reference herein.

FIELD OF THE INVENTION

The present invention relates to a refractory, oxidation-resistant, and corrosion-resistant protective coating for application to a substrate, and a method for manufacturing this protective coating and its use.

BACKGROUND

Corrosion and oxidation protective coatings of this type are known and are used in particular in parts of turbines or aircraft propulsion engines, as well as in combustion chambers. MCrAlY coatings are used as hot-corrosion protective coatings, as are described, for example, in U.S. Pat. No. 4,080, 486, EP-B 1-0486489, and U.S. Pat. No. 4,585,481. In addition, these MCrAlY coatings may be used as an adhesion promoter or as an adhesive layer between the metallic substrate to which the protective coating is applied and a ceramic cover layer. The protective coating is applied in particular through thermal spraying methods, e.g., flame spraying, high-speed flame spraying, detonation spraying, plasma spraying, arc spraying, laser spraying, or molten bath spraying. The qualitatively best results have been achieved by the low-pressure plasma spraying method (LPPS), since closed and dense coatings arise here. Other plasma spraying methods, such as atmospheric plasma spraying (APS), achieve poorer results. Thus, the APS method is the most cost-effective method, but the resulting spray coatings have a very high number of pore inclusions and, in particular, connected oxide inclusions and oxide streaks. For this reason, the coatings produced using the APS method have the lowest quality in regard to their hot gas corrosion resistance at temperatures in the range of 1000° C. in comparison to other plasma spraying methods. In particular, the oxide and nitride inclusions increasingly occurring in the APS method and the connection of these inclusions into spatial networks represent ideal migration paths for, among other things, $O_2$ at high temperatures, because of which these coatings are relatively susceptible to corrosion.

However, the APS method has decisive advantages. In particular, it is a cost-effective coating method in comparison to the other plasma spraying methods. Furthermore, there is a large possibility for variation of the composition of the metallic material, in particular of the powder composition. In addition, besides the chemical composition, the particle sizes and the coating gradation may be varied in different layers. Furthermore, it is possible for defined surface roughnesses to be set for clamping ceramic cover layers to the protective coating.

Different methods are known for improving the properties of APS-sprayed coatings. Thus, DE-A-2414992 describes a method for improving the high-temperature corrosion resistance of a nickel-based or cobalt-based superalloy body. In this case, the superalloy body is first coated using physical vapor deposition with a composition which is essentially composed of chromium, aluminum, and a part that is selected from yttrium and the rare earth elements, and at least one element which is selected from the group including iron, cobalt, and nickel. Subsequently, the coated body is aluminized using chemical vapor deposition to elevate the corrosion resistance of the body. Through the aluminizing coating, grain boundaries of the first coating, which are oriented in a direction perpendicular to the deposition plane, are to be closed. DE-T2-69536781 also describes a method for improving the oxidation resistance of a platinum-modified aluminite coating produced on a nickel-based superalloy substrate. In this case, a platinum layer is first provided on the substrate. The platinum layer is subsequently aluminized.

SUMMARY OF THE INVENTION

The above-referenced known methods have the disadvantage, however, that at least two coating steps are necessary here for modifying the spray coating produced from a metallic material. Furthermore, the methods cited are not suitable for destroying the networks of oxide and nitride inclusions which are formed in spray coatings and connected to one another. Because of the complexity of the known methods, they are also costly.

It is therefore the object of the present invention to provide a refractory, oxidation-resistant, and corrosion-resistant protective coating for application to a substrate, in particular for application to parts of turbines or aircraft propulsion engines, which may be manufactured cost-effectively and, in addition, has improved thermal corrosion resistance.

It is furthermore the object of the present invention to provide a method for manufacturing a refractory, oxidation-resistant, and corrosion-resistant protective coating which is relatively simple and cost-effective to perform.

A refractory, oxidation-resistant, and corrosion resistant protective coating according to the present invention for application to a substrate, in particular for application to parts of turbines or aircraft propulsion engines, includes a spray coating made of a thermally sprayed, primarily metallic material, the coating being at least partially subjected to a thermo-chemical aluminum (Cr, Si) deposition process having a specifically high aluminum deposition activity after the application of the protective coating to the substrate, in such a way that the protective coating has an alloy gradient of Al (Cr, Si), which increases from the substrate surface to the coating surface, and isolated globulitic metal oxide particles. The specifically high aluminum depostion activity is preferably 25-45%, percent weight, Al in equilibrium in gas phase.

The pores present in the spray coating are advantageously sealed in the protective coating according to the present invention; in particular, they are sealed in a defined way so that oxide and/or nitride particles in the spray coating are positioned in isolated, globulitic form. Because the originally existing networks of oxide and/or nitride particles or inclusions, which are connected to one another, are not present or are destroyed, the migration paths within the protective coating are reduced to a minimum, because of which the protective coating has improved refractory properties, oxidation resistance, and corrosion resistance. The high proportions of aluminum, in particular in the outer regions of the protective coating, also contribute decisively to this quality improvement.

The metallic material typically has a composition according to the formula MCrAlXAE, in which M=Fe, Co, Ni, NiCo, or CoNi; X=Si, Ta, V, Nb, Pt, or Pd; and AE=Y, Ti, Hf, Zr, or Yb. In an advantageous embodiment of the protective coating according to the present invention, the metallic material has the following composition according to the formula MCrAlXAE (in weight percent): 10%-45% Cr, 1%-10% Al, 0.25%-15% X, 0.05%-2% AE, and the remainder M as the main matrix elements.

In a further advantageous embodiment of the protective coating, the metallic material is provided in powdered form, the mean particle size of the powder being between 2 μm and 80 μm. The spray coating typically has a mean coating thickness between 50 μm and 400 μm.

In a further advantageous embodiment of the protective coating according to the present invention, the aluminum component is between 25% and 40%, weight percent, in the region of the coating surface, between 20% and 40%, weight percent, in the regions of the protective coating thereunder, and below 20%, weight percent, in the transition region between the protective coating and the substrate.

The isolated globulitic metal oxide particles provided according to the present invention preferably have a mean particle size between 0.1 μm and 5 μm with a maximum size of individual particles of up to 25 μm. The volume component of the isolated globulitic metal oxide particles in the protective coating is between 0.2% and 6%, preferably 0.5% to 2%. In particular, the globulitic metal oxide particles are made of $Al_2O_3$ and $Cr_2O_3$.

In a further advantageous embodiment of the protective coating according to the present invention, a ceramic cover layer is formed on the coating surface. A thermal insulation layer thus advantageously arises on a substrate which is under a certain thermal stress, such as a turbine component. It is also possible for an intermediate coating made of Pt and/or Pd having a layer thickness between 0.1 μm and 10 μm to be implemented between the coating surface and the ceramic cover layer. The thermal insulation properties of the protective coating are thus again improved.

The refractory, oxidation-resistant, and corrosion-resistant protective coating is used in particular in coating and/or repairing turbine and engine parts, in particular gas turbines in aircraft propulsion engines.

A method according to the present invention for manufacturing a refractory, oxidation-resistant, and corrosion-resistant protective coating includes the following method steps: a) providing a spray coating at normal atmosphere to $10^{-3}$ mbar made of a thermally sprayed, primarily metallic material for application to a substrate, in particular for application to parts of turbines or aircraft propulsion engines and b) treating at least a part of the spray coating using a thermochemical aluminum (Cr, Si) deposition process having a specifically high aluminum deposition activity in such a way that the protective coating has increasing alloy gradients of Al (Cr, Si) from the substrate surface to the layer surface and isolated globulitic metal oxide particles. By using a thermal spray method at normal atmosphere to $10^{-3}$ mbar, in particular by using an APS method for thermochemical treatment of at least a part of the spray coating, a simple and cost-effective method may be provided. In addition, in the method according to the present invention, pores in the spray coating are sealed in a defined way through the targeted thermochemical treatment, oxide dispersion particles are converted into isolated, globulitic form and positioned accordingly and a defined alloy gradient of Al (Cr, Si) is produced from the substrate surface to the coating surface. In particular, aluminum is enriched in the outer layers of the protective coating. The protective coatings manufactured through the method have significantly improved refractory properties, oxidation resistance, and corrosion resistance. According to the present invention, the advantages of APS-sprayed coatings in particular, which allow a free alloy selection, high coating thicknesses, and a high DBTT point, are combined with the advantages of aluminum diffusion coatings, specifically a high oxidation resistance with good refractory properties.

In an advantageous embodiment of the method according to the present invention, the thermochemical aluminum (Cr, Si) deposition process according to method step b) includes the following substeps: b1) heating the spray coating and/or the substrate having the spray coating in a neutral or oxidative environment in relation to the metal oxide of the spray coating; b2) aluminum (Cr, Si) delivery via a gas phase or through direct contact with aluminum contents of the environment of 25% to 45%, weight percent, aluminum; and b3) cooling the spray coating and/or the substrate having the spray coating in a neutral or oxidative environment. In this case, in method step b1), the spray coating and/or the substrate having the spray coating may be heated to up to 1000° C. in a gaseous environment made of Ar, He and possibly components of $O_2$ and $H_2O$, wherein the partial pressure of $O_2$ in the gaseous environment in chemical equilibrium are at least higher by a factor of 2 to 10 than the partial pressure of $O_2$ in the decomposition reaction of the metal oxides contained in the spray coating. Typically, an $O_2$ partial pressure of 10 mbar to 400 mbar, preferably 20 mbar to 300 mbar, is set in the gaseous environment at normal pressure on heating up to 1100° C. Furthermore, aluminum (Cr, Si) delivery according to method step b2) is performed at temperatures between 900° C. and 1150° C. over a process holding period of between 2 hours and 14 hours. In an advantageous embodiment of the method according to the present invention, aluminum (Cr, Si) delivery according to method step b2) is performed via a gas phase, the gas phase having monohalogenated aluminum compounds. The monohalogenated aluminum compounds have a partial pressure component of the total system between 2.5% and 25%, preferably 5% to 20% in this case. The partial pressure component of argon or $H_2$ may simultaneously be 20% to 80%. Furthermore, it is possible for the cooling of the spray coating and/or the substrate having the spray coating according to method step b3) in a gaseous environment made of Ar, He, and possibly components of $H_2$ and metal halogenides to be performed at an absolute pressure between $10^{-3}$ mbar and 1 bar at up to room temperature.

In further advantageous embodiments of the method according to the present invention, it is additionally possible that, instead of thermal spraying, a spray coating is provided for application to the substrate as a suspension, as a sol-gel coating using slurry immersion, using manual application or application with the aid of a spray-mist spray gun.

BRIEF DESCRIPTION OF THE DRAWINGS

Further details, features, and advantages of the present invention result from the exemplary embodiments and applications illustrated in the figures.

DETAILED DESCRIPTION

Figure 1A:
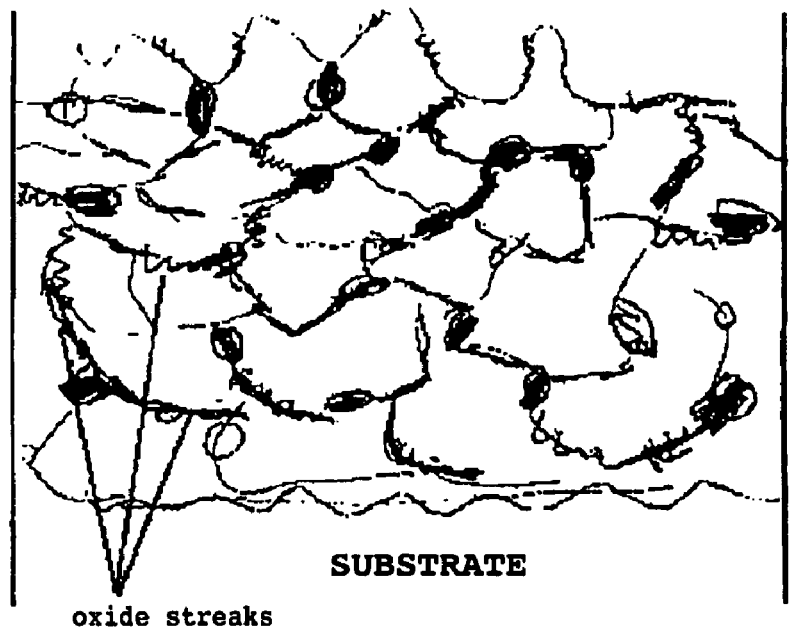
FIG. 1a shows a schematic illustration of the microstructure of a spray coating of the protective coating according to the present invention applied to a substrate prior to a thermochemical aluminum (Cr, Si) deposition process.

FIG. 1a shows a schematic illustration of the microstructure of a spray coating made of a thermally sprayed, primarily metallic material, which has been applied to a substrate, in particular to parts of turbines or aircraft propulsion engines. Oxide streaks which are connected to one another as well as spattered particles on the connection surfaces and/or the grain boundaries are apparent. The dense, coherent oxide covering of the spray coating is also visible.

Figure 1B:
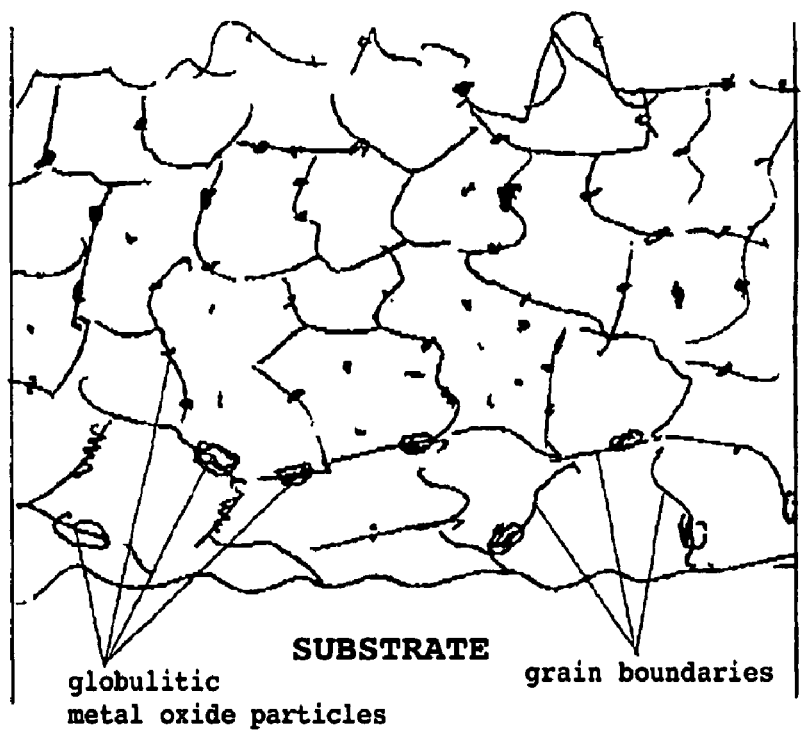
FIG. 1b shows a schematic illustration of the microstructure of the spray coating according to FIG. 1a subsequently to the thermochemical aluminum (Cr, Si) deposition process.

FIG. 1b shows the embodiment of the spray coating and/or the protective coating subsequently to an at least partially performed thermochemical aluminum (Cr, Si) deposition process having a specifically high aluminum deposition activity. It may be seen that subsequently to the thermochemical treatment, empty spaces and/or pores have been healed by the treatment, i.e., empty points have been filled up by absorbing aluminum (Cr, Si) into the metal lattice. In addition, isolated, globulitic metal oxide particles are visible. The oxide and/or nitride networks occurring prior to the thermochemical treatment are no longer present.

Figure 2A:
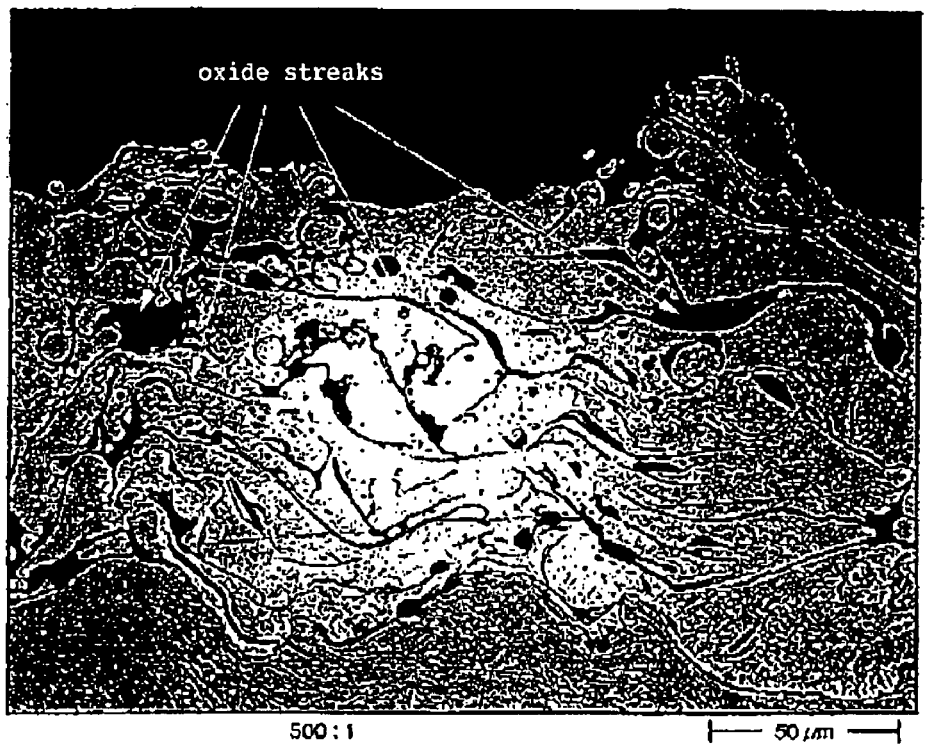
FIG. 2a shows the illustration of a cross section of a spray coating of the protective coating according to the present invention prior to the thermochemical treatment.

In the following, an exemplary embodiment of the protective coating and three different application variations of the method are explained in greater detail;

A metallic, powdered material made of a NiCrAlY mixture having the mean composition (in weight percent): 20% Cr, 8% Al, 1% Y, the balance nickel, having a particle size of approximately 60 µm, is sprayed on a turbine vane (the substrate), having approximately 250 mm component length and made of a nickel-based alloy Rene 80, using an atmospheric plasma spray method (APS) having Ar/$H_2$ as the conveyor gas in a spray gun as an average 200 µm thick coating. The coating is predominantly sprayed on the intake and outlet edges of the vane profile or on the outer and inner shrouds in this case. In FIG. 2a, a cross section of this spray coating is shown. The cross-linked oxide streaks and embedded pores are visible. The total proportion of the metal oxides and pores is approximately 5 volume percent. However, this may vary from 0.5 to 10 volume percent. In non-thermally sprayed coatings, i.e., coatings applied at room temperature, such as sol-gel coatings, the pore component may reach up to 20 volume percent.

The APS-sprayed component is subsequently subjected to a thermochemical aluminum (Cr, Si) deposition process having a specifically high aluminum deposition activity. In this case, in a first method step, the spray coating and/or the component having a spray coating is heated in an argon atmosphere at normal pressure from room temperature up to 950° C. The oxygen partial pressure is set in this case in a range between 200 mbar and 600 mbar, this being performed through controlled addition of $O_2$ via a needle valve. In order to reach this, 560 l/h Ar and 0.2 l/h $O_2$ are supplied to the reaction chamber. No further $O_2$ is supplied from approximately 900° C. In a further method step, the temperature is elevated from 950° C. to 1080° C. The component is held at this temperature in a type of gas atmosphere containing approximately 20% aluminum monofluoride, 5% aluminum trifluoride, and the balance argon. The gas and/or process atmosphere is produced through the reaction of $AlF_3$ and AlCr particles supplied in powdered form having an aluminum content of 50 to 55 weight percent. Subsequently, the components are cooled from 1080° C. to room temperature in the argon atmosphere having an $O_2$ partial pressure from 20 mbar to 50 mbar. This is performed through a half-hour flushing of the process atmosphere using a flushing rate which is greater than 40 times the volume exchange rate in relation to the reaction gas volume in the temperature range between 1080° C. and 1000° C. and a flushing rate which corresponds to five to two times the volume exchange rate in the temperature range from 1000° C. to room temperature.

Figure 2B:
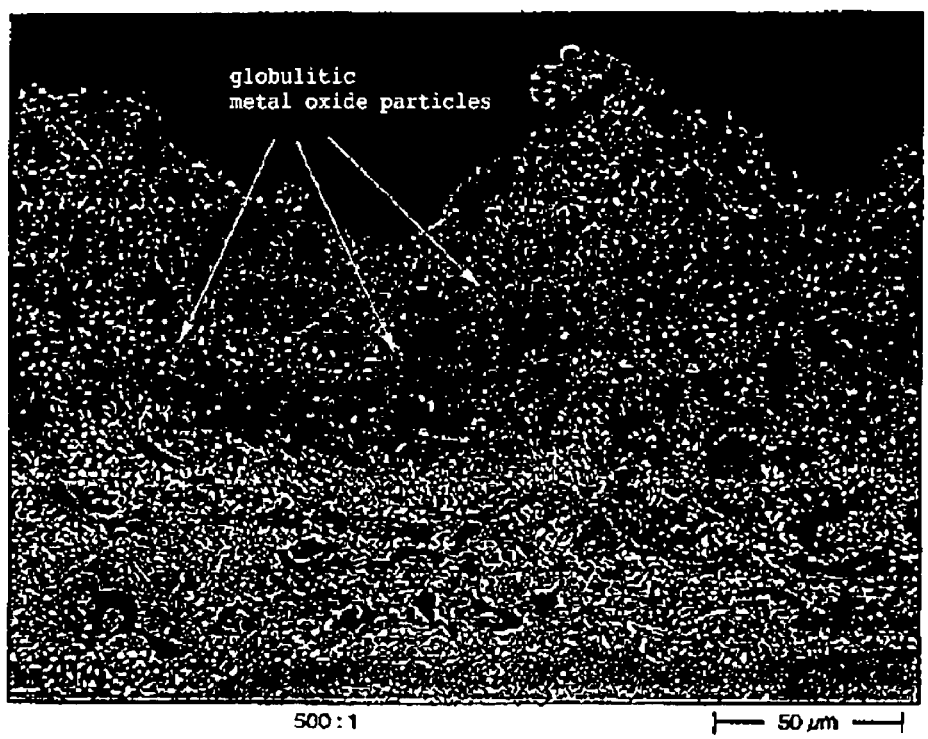
FIG. 2b shows an illustration of a cross section of the spray coating according to FIG. 2a subsequently to the thermochemical treatment.

FIG. 2b shows the resulting spray coating subsequently to this thermochemical treatment. The clearly isolated globulitic metal oxide particles having a particle size between 1 µm and 10 µm and an area component of 2% in the outer 80% of the spray coating are visible. The aluminum concentration is approximately 32 weight percent in the outer 20% of the spray coating, approximately 26 weight percent in the further 50% of the spray coating, and approximately 10 weight percent in the remaining region, i.e., in the region of the coating-substrate transition.

The APS-sprayed component may alternatively also be placed in a reaction chamber having bulk material made of intermetallic AlCr donor granulate and 240 g powdered metal chloride salt, in this case $MgCl_2$. The reaction chamber has a size of 120 l in this case and is provided with supply lines for hydrogen and argon. The reaction chamber is sealed to the environment using a gas-permeable $Al_2O_3$ felt. In a first step, the component having the spray coating is heated in argon atmosphere at slight overpressure to 900° C. For this purpose, the reaction chamber is flushed before heating at five times the volume exchange rate using argon and during heating using 10 l/h Ar to achieve an overpressure of 30 mbar in relation to normal pressure. At approximately 900° C., 10 l/h $H_2$ is supplied for an hour. In a further step, the temperature is elevated to 1080° C. without further supply of Ar or $H_2$. The component is held at this temperature for 6 hours. A gas flow of 1-2 l/h $H_2$ ensures the maintenance of a slight overpressure of 30 mbar to 50 mbar in relation to normal pressure. Subsequently, the component is cooled in argon atmosphere to room temperature. This is performed first through 15 minutes of flushing using 2000 l/h $H_2$ and a subsequent supply of 50 l/h Ar.

The resulting spray coating then has an aluminum concentration of 33 weight percent in the upper region. The resulting globulitic metal oxide particles have a particle size from 2 µm to 18 µm and a proportion of 3.2 weight percent.

In a further method variation, the APS-sprayed component is placed in a reaction chamber containing a bulk material made of intermetallic AlCr donor granulate. The reaction chamber has the same features as in the second method variation in this case. The component having the spray coating is heated from room temperature to 1060° C. HCl and $H_2$ are conducted through the AlCr bulk material using a ring nozzle system, so that the HCl may react with the aluminum component of the AlCr granulate to form aluminum trichloride and aluminum monochloride. For this purpose, 10-25 l/h HCl is supplied. The flow rate through the AlCr bulk material is less than 4 m/h in this case; a slight overpressure of approximately 30 mbar in relation to normal pressure thus arises. The component is held at 1060° C. for 6 hours and then flushed using 500 l/h $H_2$. The component is cooled in argon atmosphere to room temperature from a temperature of 750° C.

The coating thus produced has an aluminum concentration of 31.5 weight percent in the outer region and achieves an average of 580 load changes in a thermal shock test.

What is claimed is:

1. A method for manufacturing a refractory, oxidation-resistant, and corrosion-resistant protective coating, wherein the method includes the following steps:
    a) providing, on a substrate, a coating, at normal atmosphere to $10^{-3}$ mbar made of a suspension or as a sol-gel coating using slurry immersion, of a primarily metallic material; and
    b) treating at least a part of the coating using a thermochemical deposition process using aluminum, chromium and silicon in such a way that the coating has increasing alloy gradients of aluminum, chromium and silicon from the substrate surface to the coating surface and isolated globulitic metal oxide particles.

2. The method as recited in claim 1, wherein the thermochemical deposition process using aluminum, chromium and silicon has a aluminum deposition activity of 25-45%, percent weight, aluminum in equilibrium in gas phase.

3. The method of claim 1 wherein the treating step includes sealing pores of the coating to form the isolated globulitic metal oxide particles.

4. The method of claim 3 wherein the isolated globulitic metal oxide particles are oxide and/or nitride particles.

* * * * *